(12) United States Patent
Zhou et al.

(10) Patent No.: US 11,599,608 B2
(45) Date of Patent: Mar. 7, 2023

(54) UNLOCKING CONTROL METHOD AND RELATED PRODUCTS

(71) Applicant: GUANGDONG OPPO MOBILE TELECOMMUNICATIONS CORP., LTD., Guangdong (CN)

(72) Inventors: Yibao Zhou, Guangdong (CN); Haiping Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 650 days.

(21) Appl. No.: 16/622,727

(22) PCT Filed: Jun. 13, 2018

(86) PCT No.: PCT/CN2018/091089
§ 371 (c)(1),
(2) Date: Dec. 13, 2019

(87) PCT Pub. No.: WO2019/015418
PCT Pub. Date: Jan. 24, 2019

(65) Prior Publication Data
US 2021/0141878 A1    May 13, 2021

(30) Foreign Application Priority Data
Jul. 18, 2017   (CN) .......................... 201710585004.4

(51) Int. Cl.
*G06F 21/00*   (2013.01)
*G06F 21/32*   (2013.01)
(Continued)

(52) U.S. Cl.
CPC .............. *G06F 21/32* (2013.01); *G06V 10/20* (2022.01); *G06V 10/993* (2022.01); *G06V 40/70* (2022.01); *G06V 40/1365* (2022.01); *G06V 40/14* (2022.01); *G06V 40/15* (2022.01); *G06V 40/172* (2022.01); *G06V 40/197* (2022.01); *H04M 1/725* (2013.01)

(58) Field of Classification Search
CPC ...... G06F 21/32; G06V 10/20; G06V 10/993; G06V 40/70
See application file for complete search history.

(56) References Cited

U.S. PATENT DOCUMENTS 9,762,581 B1 *  9/2017  Wang .................... G06K 9/6293
2006/0282671 A1 * 12/2006  Burton .................... G16H 10/60
                                                       713/176
(Continued)

FOREIGN PATENT DOCUMENTS

CN     201638241       11/2010
CN     105653922       6/2016
(Continued)

OTHER PUBLICATIONS

EPO, Communication for EP Application No. 18834817.1, dated Apr. 1, 2021.
(Continued)

*Primary Examiner* — Jeffrey C Pwu
*Assistant Examiner* — Thong P Truong
(74) *Attorney, Agent, or Firm* — Hodgson Russ LLP (57) ABSTRACT

The embodiment of the disclosure provides an unlocking control method and related products. The method includes: acquiring an environmental parameter; acquiring first biometric information; determining a first biometric control parameter and second biometric control information corresponding to the environmental parameter; performing a first biometric recognition on the first biometric information according to the first biometric control parameter; when the first biometric information is recognized, acquiring second biometric information and performing a second biometric recognition on the second biometric information according to the second biometric control information; performing a next unlocking process when the second biometric information is recognized. Thus, control parameters of recognition
(Continued)

processes can be set suitable for the environment, and recognition processes are controlled based on these control parameters, thereby improving the pass rate and the efficiency of the multi-biometric recognition.

20 Claims, 6 Drawing Sheets

(51) Int. Cl.

| | | |
|---|---|---|
| *G06V 10/20* | (2022.01) | |
| *G06V 10/98* | (2022.01) | |
| *G06V 40/70* | (2022.01) | |
| *H04M 1/725* | (2021.01) | |
| *G06V 40/14* | (2022.01) | |
| *G06V 40/10* | (2022.01) | |
| *G06V 40/16* | (2022.01) | |
| *G06V 40/18* | (2022.01) | |
| *G06V 40/12* | (2022.01) | |

(56) References Cited

U.S. PATENT DOCUMENTS

| | | |
|---|---|---|
| 2013/0191908 A1 | 7/2013 | Klein |
| 2017/0076146 A1* | 3/2017 | Saripalle .............. G06V 10/751 |
| 2017/0193210 A1 | 7/2017 | Liu et al. |

FOREIGN PATENT DOCUMENTS

| | | |
|---|---|---|
| CN | 105825109 | 8/2016 |
| CN | 106022057 | 10/2016 |
| CN | 106022059 | 10/2016 |
| CN | 106056054 | 10/2016 |
| CN | 106250751 | 12/2016 |
| CN | 106407776 | 2/2017 |
| CN | 106599660 | 4/2017 |
| CN | 106599875 | 4/2017 |
| CN | 107480488 | 12/2017 |
| GB | 2517562 | 2/2015 |
| WO | 2017082800 | 5/2017 |

OTHER PUBLICATIONS

EPO, Office Action for EP Application No. 18834817.1, dated Mar. 30, 2020.
IPI, Office Action for IN Application No. 201917052968, dated Jun. 25, 2021.
WIPO, ISR for PCT/CN2018/091089, Jul. 27, 2018.
SIPO, First Office Action for CN Application No. 201710585004.4, dated Apr. 12, 2019.
SIPO, Second Office Action for CN Application No. 201710585004.4, dated Jul. 23, 2019.

* cited by examiner

UNLOCKING CONTROL METHOD AND RELATED PRODUCTS

CROSS-REFERENCE TO RELATED APPLICATIONS

This application is a U.S. national phase application of International Application No. PCT/CN2018/091089, filed Jun. 13, 2018, which claims priority to Chinese Patent Application No. 201710585004.4, filed on Jul. 18, 2017, the entire disclosures of which are incorporated herein by reference.

TECHNICAL FIELD

The present disclosure relates to the field of electronic device technologies, and more particular, to an unlocking control method and related products.

BACKGROUND

With the widespread use of electronic devices such as mobile phones, tablets, and the like, more and more applications can be supported by the electronic devices, and thereby their functions are becoming more and more powerful. Electronic devices are developing in a diversified and personalized way and becoming indispensable for users.

At present, multi-biometric recognition is increasingly favored by electronic equipment manufacturers. However, multi-biometric recognition may be affected by the environment, thereby reducing the recognition efficiency. Therefore, it is needed to be solved how to improve the recognition efficiency of multi-biometric recognition.

SUMMARY

An embodiment of the disclosure provides an unlocking control method and related products, to solve the problem that a foldable and flexible display is inconvenient to be unlocked in a folded state.

In a first aspect, an embodiment of the disclosure provides an electronic device, which includes an environmental sensor, a first biometric recognition device, a second biometric recognition device, and an application processor, the environmental sensor, the first biometric recognition device and the second biometric recognition device each being connected to the application processor, wherein the environmental sensor is configured to acquire an environmental parameter; the first biometric recognition device is configured to acquire first biometric information; the application processor is configured to determine a first biometric control parameter and second biometric control information corresponding to the environmental parameter, and perform a first biometric recognition on the first biometric information according to the first biometric control parameter;
the second biometric recognition device is configured to acquire second biometric information, when the first biometric recognition is passed;
the application processor is configured to perform a second biometric recognition on the second biometric information, according to the second biometric control information, and perform a next unlocking process when the second biometric recognition is passed.

In a second aspect, an embodiment of the disclosure provides an unlocking control method, which comprises:
acquiring an environmental parameter;
acquiring first biometric information;
determining a first biometric control parameter and second biometric control information corresponding to the environmental parameter;
performing a first biometric recognition on the first biometric information according to the first biometric control parameter;
acquiring second biometric information when the first biometric recognition is passed; performing a second biometric recognition on the second biometric information, according to the second biometric control parameter; and
performing a next unlocking process when the second biometric recognition is passed.

In a third aspect, an embodiment of the disclosure provides an unlocking control device, which includes:
a first acquiring unit, configured to acquire an environmental parameter;
a second acquiring unit, configured to acquire first biometric information;
a determining unit, configured to determine a first biometric control parameter and second biometric control information corresponding to the environmental parameter;
a recognition unit, configured to perform a first biometric recognition on the first biometric information according to the first biometric control parameter;
a third acquiring unit, configured to acquire second biometric information, when the first biometric recognition is passed;
the recognition unit also being configured to perform a second biometric recognition on the second biometric information, according to the second biometric control information; a processing unit, configured to perform a next unlocking process when the second biometric recognition is passed.

In a fourth aspect, an embodiment of the disclosure provides an electronic device, which includes an application processor, a memory and one or more programs, the one or more programs are stored in the memory and is configured to be executed by the application processor, the one or more programs includes instructions configured to perform part of or all steps of the method of the second aspect.

In a fifth aspect, an embodiment of the disclosure provides a computer readable storage medium, configured to store a computer program therein. The computer program is configured to enable a computer to perform part of or all steps of the method of the second aspect.

In a sixth aspect, an embodiment of the disclosure provides a computer program product, which includes a non-transitory computer readable storage medium having a computer program stored therein, the computer program is executable to enable a computer to perform part of or all steps of the method of the second aspect. The computer program product can be a software installation package.

The embodiments of the disclosure have the following effects.

It can be seen that the embodiment of the disclosure includes the operations of: acquiring an environmental parameter; acquiring first biometric information; determining a first biometric control parameter and second biometric control information corresponding to the environmental parameter; performing a first biometric recognition on the first biometric information according to the first biometric control parameter; when the first biometric recognition is passed, acquiring second biometric information; performing a second biometric recognition on the second biometric information according to the second biometric control information; when the second biometric information recognition is passed, performing a next unlocking process. Therefore, control parameters can be set suitable for the environment, recognition processes are controlled based on these control parameters, thereby improving the pass rate and the efficiency of the multi-biometric recognition.

BRIEF DESCRIPTION OF THE DRAWINGS

In order to more clearly illustrate the embodiments of the disclosure or the technical solutions in the prior art, the drawings to be used in the embodiments or the prior art are briefly described below. Obviously, the following drawings are just for certain embodiments of the disclosure, and other drawings can be obtained according to these drawings without any creative effort for those skilled in the art.

DETAILED DESCRIPTION

The technical solutions in the embodiments of the disclosure are clearly and completely described in the following with reference to the accompanying drawings of the embodiments, in order to enable those skilled in the art to better understand the disclosure. The embodiments described are just some of the disclosure but not all of the embodiments. All other embodiments obtained based on the embodiments of the disclosure without creative effort, by those skilled in the art, are within the scope of the disclosure.

The terms "first", "second" and the like in the specification and claims of the disclosure and the above drawings are used to distinguish different objects, and are not intended to describe a specific order thereof. The terms "comprising" and "having" and any variants thereof are intended to cover a non-exclusive inclusion. For example, a process, method, system, product, or device that comprises a series of steps or units is not limited to the listed steps or units, but optionally also includes not listed steps or units, or alternatively other steps or units inherent to the process, method, product, or device.

The "embodiment" mentioned in the disclosure means that, a particular feature, structure, or characteristic described in connection with the embodiment can be included in at least one embodiment of the disclosure. This term appeared in various positions of the specification is not necessarily referring to the same embodiment, and is not exclusive or alternative embodiment that is mutually exclusive with other embodiments. Those skilled in the art will understand obviously and implicitly that the embodiments described herein can be combined with other embodiments.

The electronic device referred to in the embodiments of the disclosure may include various handheld devices having wireless communication functions, in-vehicle devices, wearable devices, computing devices, or other processing devices connected to a wireless modem, and various forms of user equipment (UE), mobile station (MS), terminal device, etc. For convenience of description, the devices mentioned above are collectively referred to as electronic devices. Embodiments of the disclosure are described in detail below.

It should be noted that the electronic device in the embodiment of the disclosure may be installed with a multi-biometric device, and the multi-biometric device may be composed of a number of biometric devices. The biometric devices may include, but are not limited to, a fingerprint recognition device. an iris recognition device, a face recognition device, a vein recognition device, an electroencephalogram recognition device, an electrocardiogram recognition device, and the like, each of the biometric devices has a corresponding recognition algorithm and a recognition threshold, and each of the biometric devices has a corresponding template preset by a user. For example, the fingerprint recognition device has a preset fingerprint template corresponding thereto. Further, the fingerprint recognition device can collect a fingerprint image, and pass the recognition when a matching value between the fingerprint image and the preset fingerprint template is greater than a corresponding recognition threshold.

Further, a multi-biometric recognition mode in the embodiment of the disclosure may include two or more recognition operations, for example, a fingerprint recognition is performed at first, and then a face recognition can be performed after the passing of the fingerprint recognition, or, the fingerprint recognition and the face recognition can be performed synchronously. The multi-biometric recognition mode has better security than a single biometric recognition mode (for example, unlocking just by fingerprint recognition), and thus, the multi-biometric recognition mode is becoming more and more popular.

Further, in the embodiment of the disclosure, first biometric information may include, but is not limited to, fingerprint information, iris information, face information, vein information, brain wave information, electrocardiogram information, and the like. Second biometric information may include, but is not limited to, fingerprint information, iris information, face information, vein information, brain wave information, electrocardiogram information, and the like. First biometric control parameters may include, but are not limited to, a first recognition algorithm, a first recognition threshold, a first recognition area, a first recognition region, and the like. For example, the first biometric control parameter can be used to reduce the recognition threshold, or reduce the complexity of the recognition algorithm, or select a corresponding recognition algorithm based on different environments, so the recognition efficiency can be improved without reducing the security. A first biometric recognition device may be used to acquire the first biometric information, and the first biometric recognition device may be one of the follows: a fingerprint recognition device, an iris recognition device, a face recognition device, a vein recognition device, an electroencephalogram recognition device, and an electrocardiogram recognition device, and the like.

Further, the type of the first biometric information and the second biometric information may be different. For example, the first biometric information is fingerprint information, the second biometric information is iris information. For another example, the first biometric information is face information, and the second biometric information is iris information. For still another example, the first biometric information is fingerprint information, and the second biometric information is face information. Second biometric control parameters may include, but are not limited to, a second recognition algorithm, a second recognition threshold, a second recognition area, a second recognition region, and the like. For example, the second biometric control parameter can be used to reduce the recognition threshold, or reduce the complexity of the recognition algorithm, or select a corresponding recognition algorithm based on different environments, so the recognition efficiency can be improved without reducing the security. A second biometric recognition device may be used to acquire the second biometric information, and the second biometric recognition device may be one of the follows: a fingerprint recognition device, an iris recognition device, a face recognition device, a vein recognition device, an electroencephalogram recognition device, and an electrocardiogram recognition device, and the like.

Optionally, the type of the first biometric information and the second biometric information may be the same, e.g., both are fingerprint recognition. In this case, fingerprint recognition algorithms of the two may be different, or fingerprint recognition thresholds of the two may be different.

Figure 1A:
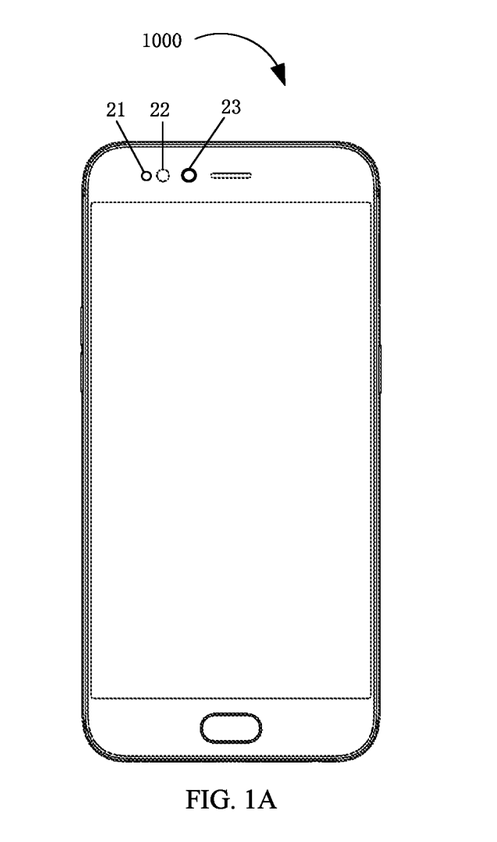
FIG. 1A is a schematic structural diagram of a smart phone according to an embodiment of the disclosure.

The embodiments of the disclosure are described in detail below. FIG. 1A illustrates an exemplary smart phone 1000, an iris recognition device of the smart phone 1000 may include an infrared fill light 21 and an infrared camera 22. During a working process of the iris recognition device, infrared lights emitted from the infrared fill light 21 reach the iris, and are reflected by the iris and then back to the infrared camera 22, so the iris recognition device can capture images of the iris. A front camera 23 can be used as a face recognition device.

Figure 1B:
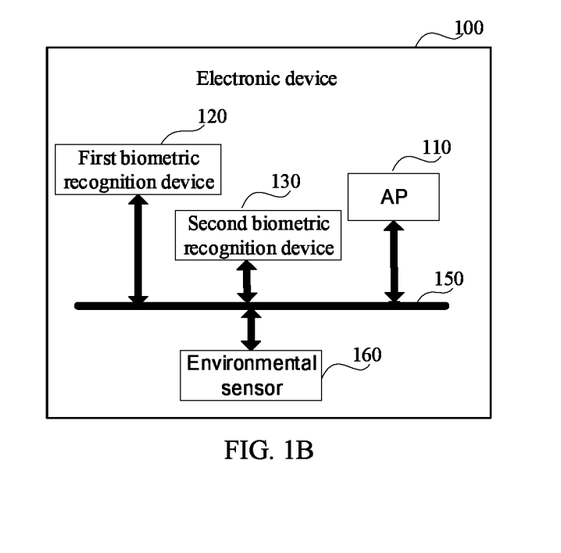
FIG. 1B is a schematic structural diagram of an electronic device according to an embodiment of the disclosure.

Referring to FIG. 1B, FIG. 1B is a schematic structural diagram of an electronic device 100. The electronic device 100 includes an application processor (AP) 110, a first biometric device 120, a second biometric device 130, and an environmental sensor 160. The AP 110 is connected with the first biometric device 120, the second biometric device 130, and the environmental sensor 160 via a bus 150.

In one possible embodiment, the environmental sensor 160 is configured to acquire one or more environmental parameters.

The first biometric device 120 is configured to acquire first biometric information.

The AP 110 is configured to determine a first biometric control parameter and a second biometric control parameter corresponding to the one or more environmental parameters, and perform a first biometric recognition on the first biometric information according to the first biometric control parameter.

The second biometric device 130 is configured to acquire second biometric information, when the first biometric recognition is passed.

The AP 110 is further configured to perform a second biometric recognition on the second biometric information according to the second biometric control parameter, and perform a next unlocking process when the second biometric recognition is passed.

In one possible embodiment, the operation of acquiring environmental parameters is performed in parallel with the operation of acquiring the first biometric information.

In one possible example, the environmental sensor 160 is specifically configured to:

acquiring the environmental information of a specified period of time, wherein the specified period of time begins with a start time of the operation of acquiring the first biometric information, and ends with a completion time of the operation of acquiring the first biometric information;

determining the one or more environmental parameters according to the environmental information.

In one possible embodiment, when determining the first biometric control parameter and the second biometric control parameter corresponding to the one or more environmental parameters, the AP 110 is specifically configured to:

determining, according to a preset mapping relationship between preset environmental parameters and preset first biometric control parameters, a first biometric control parameter corresponding to the environmental parameters; and determining, according to a preset mapping relationship between preset environmental parameters and preset second biometric control parameters, a second biometric control parameter corresponding to the environmental parameters.

In one possible example, the AP 110 is also configured to:

acquiring a matching value corresponding to the first biometric information; adjusting the second biometric control parameter according to the matching value.

When performing a second biometric recognition on the second biometric information according to the second biometric control parameter, the AP 110 is specifically configured to: performing the second biometric recognition on the second biometric information according to the adjusted second biometric control parameter.

In one embodiment, the first biometric information corresponds to a first recognition threshold, and the first recognition threshold is smaller than the matching value.

When adjusting the second biometric control parameter according to the matching value, the AP 110 is specifically used to:

determining a difference value between the matching value and the first recognition threshold; determining a target adjustment factor corresponding to the difference, according to a preset correspondence between adjustment factors and ranges of values to which the difference belongs; and adjusting the second biometric control parameter according to the target adjustment factor.

Figure 1C:
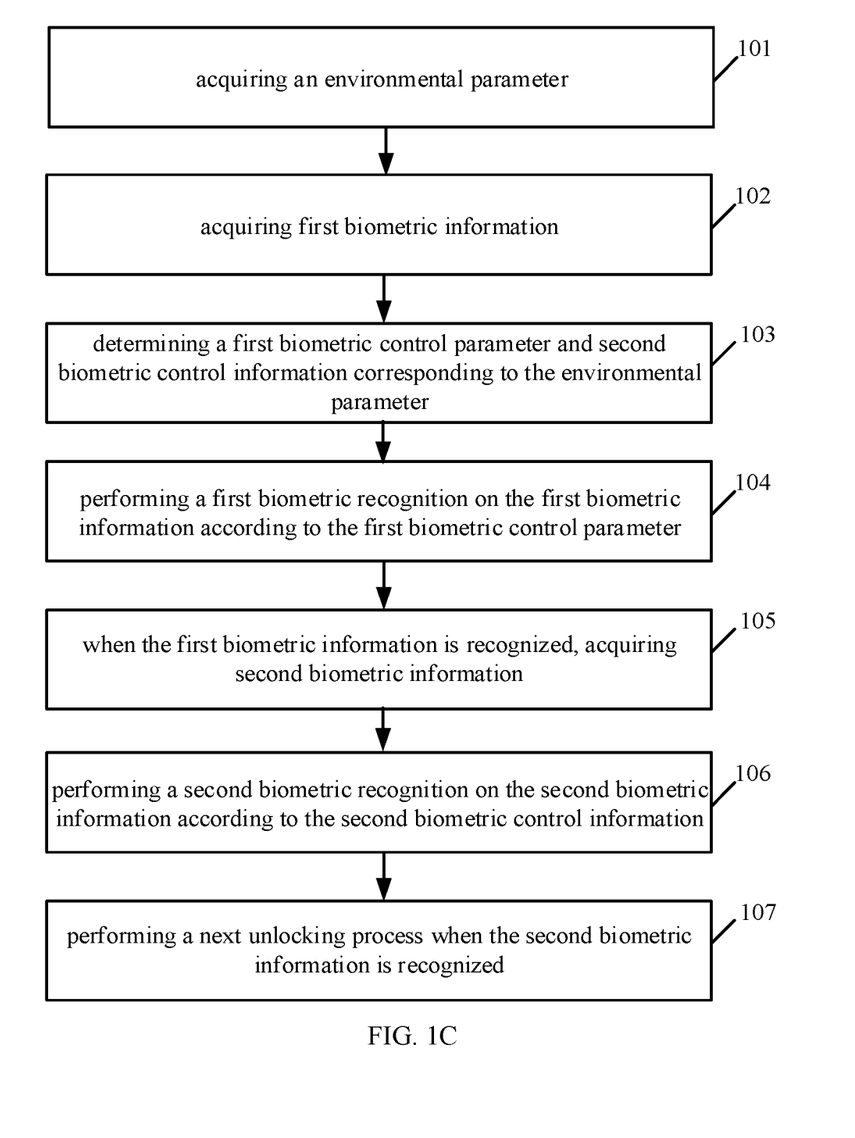
FIG. 1C is a flowchart of an unlocking control method according to an embodiment of the disclosure.

FIG. 1C is a schematic flowchart of an unlocking control method according to an embodiment of the disclosure. The unlocking control method is applied to an electronic device, whose physical map and structural diagram can be referred to FIG. 1A or FIG. 1B. The unlocking control method described in this embodiment includes the following steps.

101, one or more environmental parameters are acquired.

Environmental parameters may include, but are not limited to, ambient brightness, weather, humidity, temperature, magnetic field interference intensity, environmental color, and the like. When the unlocking operation is triggered, the environment parameters are acquired. The ambient brightness can be detected by an ambient light sensor, the weather can be obtained from a weather application, the magnetic field interference intensity can be detected by a magnetic field detecting sensor, and the environment color can be acquired by a camera.

102, first biometric information is acquired.

A first biometric recognition device corresponding to the first biometric information may be invoked to acquire the first biometric information.

Optionally, the foregoing step 102 of acquiring the first biometric information may be performed as follows: acquiring the first biometric information according to the environmental parameters.

Acquisition parameters corresponding to the first biometric recognition device may be obtained according to the environmental parameters, and the first biometric recognition device is controlled to acquire the first biometric information according to the acquisition parameters. The acquisition parameters may include, but are not limited to, intensity of fill light, focusing time, zoom, aperture size, exposure time, and the like.

Optionally, the operation of acquiring the environmental parameters is performed in parallel with the operation of acquiring the first biometric information. That is, two processes can be adopted and executed in parallel, one for obtaining environmental parameters and the other for acquiring first biometric information. Alternatively, two threads can be adopted, one thread is used to obtain environmental parameters, the other thread is used to acquire first biometric information, and the two threads are executed in parallel.

Further, the step 101 of acquiring environmental parameters may include the following steps:

11, environmental information of a specified period of time is obtained by controlling the environmental sensor, wherein the specified period of time begins with a start time of the operation of acquiring the first biometric information, and ends with a completion time of the operation of acquiring the first biometric information;

12, determining the environmental parameters according to the environmental information.

The environmental sensor includes at least one of the following: an ambient light sensor, a temperature sensor, a humidity sensor, a magnetic field detecting sensor, and the like. The above environmental information can be understood as data collected by the environmental detecting sensor. The environmental detecting sensor may be used to acquire the environmental information of the specified period, wherein a start time of the specified time period is an acquisition start time corresponding to the first biometric information, and an end time is an acquisition completion time corresponding to the first biometric information. And the environmental parameters are determined based on the environmental information. Specifically, the environmental information in the specified time period may be averaged, thereby to obtain the environmental parameter. For example, the ambient brightness values in a period of time correspond to a curve, and the ambient brightness values are averaged to form an ambient brightness as the environmental parameter.

Optionally, between the foregoing step 102 and a later step 104, the following steps may be further included: determining whether the current environment is a weak light environment according to the environmental parameters, and performing image enhancement processing on the first biometric information when it is. The step 104 is performed as follows: a first biometric recognition is performed, according to a first biometric control parameter, on the first biometric information after the image enhancement processing.

The image enhancement processing may include, but is not limited to, image denoising (e.g., wavelet transform for image denoising), image restoration (e.g., Wiener filtering), dark visual enhancement algorithm (e.g., histogram equalization, grayscale stretching, and so on).

Optionally, between the foregoing step 102 and a later step 104, the following steps may be further included:

A1, performing image quality evaluation on the first biometric information, and obtaining an image quality evaluation value;

A2, performing image enhancement processing on the first biometric information when the image quality evaluation value is lower than a preset quality threshold.

The preset quality threshold may be set by the user or set by the system by default. The first biometric information may be an image, and may be processed by image quality evaluation to obtain the image quality evaluation value, and the quality of the first biometric information is determined by the image quality evaluation value. When the image quality evaluation value is greater than or equal to the preset quality threshold, the first biometric information is considered to be qualified, and when the image quality evaluation value is less than the preset quality threshold, the first biometric information may be considered to be unqualified, thus image enhancement processing may be performed on the first biometric information.

In the above step A1, at least one image quality evaluation index may be adopted to evaluate the image quality of the first biometric information, thereby to obtain the image quality evaluation value.

A number of image quality evaluation indexes may be included, and each image quality evaluation index corresponds to a weight. Thus, when performing image quality evaluation on the first biometric information with each of the image quality evaluation indexes, corresponding evaluation results can be obtained. Finally, the obtained evaluation results are weighted to obtain the image quality evaluation value. The image quality evaluation indexes may include, but are not limited to, average value, standard deviation, entropy, sharpness, signal to noise ratio, and the like.

It should be noted that when the image quality is evaluated just using a single evaluation index, it has certain limitations. Therefore, multiple image quality evaluation indexes can be used to evaluate the image quality. It is not the more evaluation indexes, the better the evaluation result, when evaluating image quality. Because the more evaluation indexes, the higher the computational complexity of the image quality evaluation process, and such may not result in a better effect to evaluate the image quality. Thus, 2-10 image quality evaluation indexes may be adopted to evaluate the image quality, in the case of high requirements for image quality evaluation. Specifically, the number of image quality evaluation indexes and which indexes are selected, are determined according to specific implementation situations. Of course, the image quality evaluation indexes should be selected in combination with specific scenes, and the image quality evaluation indexes selected in the dark environment and that selected in the bright environment are different.

Optionally, in the case that the image quality evaluation accuracy is not high, just one image quality evaluation index may be used for evaluation. For example, the image waited to be processed is evaluated by the entropy, it can be considered that the larger the entropy, the better the image quality, and conversely, the smaller the entropy, the worse the image quality.

Optionally, in the case that the image quality evaluation accuracy is relative high, the image may be evaluated by several image quality evaluation indexes, the weight of each image quality evaluation index may be set, when obtaining a number of image quality evaluation values, a final image quality evaluation value may be obtained according to the image quality evaluation values and corresponding weights thereof. For example, three quality evaluation indexes are A index, B index and C index, the weight of A is a1, the weight of B is a2, and the weight of C is a3. When the indexes A, B and C are used to evaluate the image quality of one certain image, the image quality evaluation value corresponding to A is b1, the image quality evaluation value corresponding to B is b2, and the image quality evaluation value corresponding to C is b3, then the final image quality evaluation value=a1b1+a2b2+a3b3. In general, the larger the image quality evaluation value, the better the image quality.

103, the first biometric control parameter and the second biometric control information corresponding to the environmental parameters are determined.

The above step 103 of determining the first biometric control parameter and the second biometric control information corresponding to the environmental parameters may be implemented as follows:
determining, according to a preset mapping relationship between preset environmental parameters and preset first biometric control parameters, a first biometric control parameter corresponding to the environmental parameters; and determining, according to a preset mapping relationship between preset environmental parameters and preset second biometric control information, second biometric control information corresponding to the environmental parameters.

The mapping relationship between preset environmental parameters and preset first biometric control parameters can be preset. After acquiring the environmental parameters, the first biometric control parameter corresponding to the environmental parameter can be determined, according to the mapping relationship. Similarly, the mapping relationship between the environmental parameters and the second biometric control parameters may be preset, and after the environmental parameters are acquired, the second biometric control parameter corresponding thereto may be determined according to the mapping relationship.

104, a first biometric recognition is performed on the first biometric information according to the first biometric control parameter.

A first preset biometric template information may be pre-stored, and it is provided before performing the step 101. Based on the first biometric control parameter, the first biometric recognition is performed on the first biometric information. Specifically, the first biometric information is collected by a first biometric device, and then first biometric control parameter, such as a first recognition threshold, a first recognition algorithm, is selected corresponding to the environmental parameters. The first biometric information is matched with the first preset biometric template information based on the first recognition algorithm. When a matching value of the two is greater than a first recognition threshold, it can be considered that the recognition is passed, otherwise it can be considered that the recognition is not passed.

105, second biometric information is acquired when the first biometric recognition is passed.

When the first biometric information is recognized, the second biometric information can be obtained. A second biometric recognition device is invoked to obtain the second biometric information. When the first biometric information is not recognized, the user is prompted with a failure message.

Optionally, the above step 105 of acquiring the second biometric information can be implemented as follows:
acquiring the second biometric information according to the environmental parameters.

Acquisition parameters corresponding to the second biometric recognition device may be obtained according to the environmental parameters, and the second biometric recognition device is controlled to acquire the second biometric information according to the acquisition parameters. The acquisition parameters may include, but are not limited to, intensity of fill light, focusing time, zoom, aperture size, exposure time, and the like.

106, a second biometric recognition is performed on the second biometric information according to the second biometric control parameter.

A second preset biometric template information may be pre-stored, and it is provided before performing the step 101. Based on the second biometric control parameter, the second biometric recognition is performed on the second biometric information. Specifically, the second biometric information is collected by the second biometric device, and then second biometric control parameter, such as a second recognition threshold, a second recognition algorithm, is selected corresponding to the environmental parameters. The second biometric information is matched with the second preset biometric template information based on the second recognition algorithm. When a matching value of the two is greater than a second recognition threshold, it can be considered that the recognition is passed, otherwise it can be considered that the recognition is not failed.

107, when the second biometric information is recognized, a next unlocking process is performed.

The next unlocking process may be an unlocking operation, or, maybe waiting to acquire third biometric information.

For example, the first biometric information may be face information, the second biometric information may be iris information. When the embodiment of the disclosure is executed, the environment parameter may be obtained, the face information may be obtained, the face recognition control parameters corresponding to the environmental parameter (e.g., in weak light environment, face recognition threshold can be reduced, face recognition algorithm with low complexity is adopted) are obtained, and iris recognition control parameters corresponding to the environmental parameter (for example, in low light environment, iris recognition threshold is lowered, iris recognition algorithm with low complexity is adopted) are obtained. Further, the face information is recognized based on the face recognition control parameters, and after the face recognition is passed, the iris information is recognized based on the iris recognition control parameters. After the iris recognition is passed, the unlocking process can be performed, or, a next biometric recognition operation, for example, a fingerprint recognition may be performed.

The embodiment of the disclosure may be intermediate operations of a multi-biometric mode. For example, a multi-biometric mode is: vein recognition+face recognition+iris recognition. In the disclosure, the first biometric information corresponds to face information, the second biometric information corresponds to iris information. Then, after the vein recognition is performed and passed in the multi-biometric mode, the embodiment of the disclosure may be executed, that is, the environment parameter is obtained, then the first biometric information . . . , and so on, i.e., steps 101-107 are sequentially performed and completed.

It can be seen that, the embodiment of the disclosure includes the operations of: acquiring one or more environmental parameters; acquiring first biometric information; determining one or more first biometric control parameters and one or more second biometric control parameters corresponding to the one or more environmental parameters; performing a first biometric recognition on the first biometric information according to the first biometric control parameters; when the first biometric information is recognized, acquiring second biometric information and performing a second biometric recognition on the second biometric information according to the second biometric control parameters; when the second biometric information is recognized, performing a next unlocking process. Thus, control parameters of recognition processes can be determined to be suitable for the environment, and the recognition processes are controlled based on these control parameters, thereby improving the pass rate and the efficiency of the multi-biometric recognition.

Figure 2:
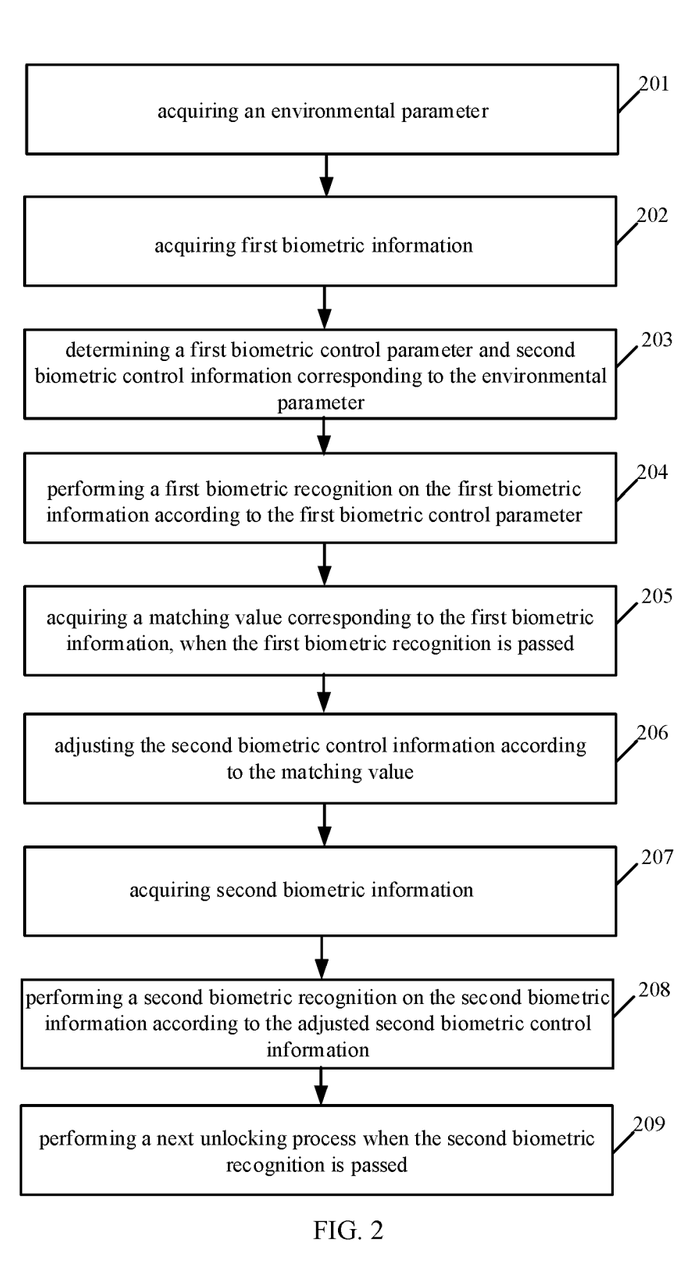
FIG. 2 is a flowchart of another unlocking control method according to an embodiment of the disclosure.

FIG. 2 is a schematic flowchart of an unlocking control method according to an embodiment of the disclosure. The unlocking control method is applied to an electronic device, whose physical map or structural diagram is illustrated in FIG. 1A or FIG. 1B. The unlocking control method described in this embodiment includes the following steps.

201, an environmental parameter is acquired.

202, first biometric information is acquired.

203, a first biometric control parameter and second biometric control information corresponding to the environmental parameter are determined.

204, a first biometric recognition is performed on the first biometric information according to the first biometric control parameter.

205, a matching value is obtained when the first biometric is recognized.

When the first biometric is recognized, it is indicated that the matching value thereof is greater than the first recognition threshold.

206, the second biometric control information is adjusted according to the matching value.

A correspondence between the matching values and second identification thresholds or second recognition algorithms may be preset, and the second biometric control information is adjusted according to the correspondence.

For example, the correspondence between two matching values may be preset, for example, the sum of the two matching values is required to be greater than 170%, then, when a first matching value is 90%, then a second matching value is only needed to reach 80%, to be recognized. When the first match value is 95%, then the second match value only needs to reach 75%. Thus, it can achieve dynamic adjustment for recognition thresholds.

Optionally, the first biometric information corresponds to a first recognition threshold, and the first recognition threshold is smaller than the matching value. The foregoing step 206 of adjusting the second biometric control information according to the matching value includes:

61, determining a difference between the matching value and the first recognition threshold;

62, determining, according to a preset correspondence between numerical ranges and adjustment factors, a target adjustment factor corresponding to the difference;

63, adjusting the second biometric control information according to the target adjustment factor.

The adjustment factor may include at least one of the following: an algorithm identifier of the second identification algorithm (the algorithm identifies an application corresponding to the algorithm), a threshold reduction coefficient (for reducing the second recognition threshold), and a reduced recognition area coefficient (for reducing Identify the area) and so on. Specifically, a difference between the matching value and the first recognition threshold may be calculated, thereby to determine a target adjustment factor corresponding thereto. Based on this, the second biometric control information is adjusted, control parameters may be flexibly adjusted, thereby facilitating to improve recognition efficiency.

207, second biometric information is acquired.

208, a second biometric recognition is performed on the second biometric information, according to the adjusted second biometric control information.

209, when the second biometric information is recognized, a next unlocking process is performed.

The other steps in the foregoing embodiment of the disclosure may refer to the corresponding steps of the unlocking control device described in FIG. 1C.

It can be seen that, the embodiment of the disclosure includes the operations of: acquiring an environmental parameter; acquiring first biometric information; determining a first biometric control parameter and second biometric control information corresponding to the environmental parameter; performing a first biometric recognition on the first biometric information according to the first biometric control parameter; when the first biometric recognition is passed, adjusting the second biometric control information according to the matching value; acquiring second biometric information; performing a second biometric recognition on the second biometric information, according to the adjusted second biometric control information; when the second biometric information is recognized, performing a next unlocking process. Therefore, control parameters of recognition processes can be determined to be suitable for the environment, the recognition processes are controlled based on these control parameters, and the control parameters can also be dynamically adjusted, thereby improving the pass rate and the efficiency of the multi-biometric recognition.

Figure 3:
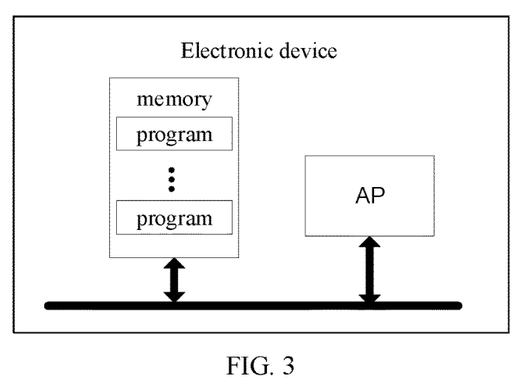
FIG. 3 is a schematic structural diagram of an electronic device according to an embodiment of the disclosure.

Referring to FIG. 3, FIG. 3 is an electronic device according to an embodiment of the disclosure. The electronic device includes an application processor AP, a memory; and one or more programs stored in the memory and configured to be executed by the AP. The one or more programs includes instructions for performing the following steps:

acquiring an environmental parameter;

acquiring first biometric information;

determining a first biometric control parameter and second biometric control information corresponding to the environmental parameter;

performing a first biometric recognition on the first biometric information according to the first biometric control parameter;

acquiring second biometric information, when the first biometric recognition is passed; performing a second biometric recognition on the second biometric information, according to the second biometric control parameter;

performing a next unlocking process, when the second biometric recognition is passed.

In one possible embodiment, the operation of acquiring an environmental parameter is parallel with the operation of acquiring first biometric information.

In one possible embodiment, the program includes instructions configured to execute the following steps of: controlling an environmental detecting sensor to acquire the environmental information of a specified period of time, wherein the specified period of time begins with a start time of the operation of acquiring the first biometric information, and ends with a completion time of the operation of acquiring the first biometric information;
determining the environmental parameter according to the environmental information.

In one possible embodiment, the program includes instructions configured to execute the following steps of:
acquiring a matching value corresponding to the first biometric information;
adjusting the second biometric control information according to the matching value. The program includes instructions for performing the following steps:
performing the second biometric recognition on the second biometric information according to the adjusted second biometric control parameter.

In one possible embodiment, the first biometric information corresponds to a first recognition threshold, and the first recognition threshold is smaller than the matching value. In the operation of adjusting the second biometric control information according to the matching value, the program includes instructions configured to execute the following steps of:
determining a difference between the matching value and the first recognition threshold;
determining, according to a preset correspondence between numerical ranges and adjustment factors, a target adjustment factor corresponding to the difference;
adjusting the second biometric control information according to the target adjustment factor.

Figure 4A:
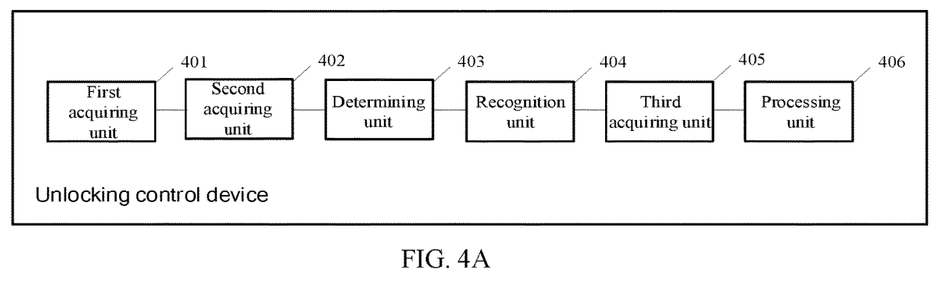
FIG. 4A is a schematic structural diagram of an unlocking control device according to an embodiment of the disclosure.

Referring to FIG. 4A, FIG. 4A is a schematic structural diagram of an unlocking control device according to one embodiment of the disclosure. The unlocking control device is applied in an electronic device, and includes a first acquiring unit 401, a second acquiring unit 402, a determining unit 403, a recognition unit 404, a third acquiring unit 405 and a processing unit 406.

The first acquiring unit 401 is configured to acquire an environmental parameter.

The second acquiring unit 402 is configured to acquire first biometric information.

The determining unit 403 is configured to determine a first biometric control parameter and second biometric control information corresponding to the environmental parameter.

The recognition unit 404 is configured to perform a first biometric recognition on the first biometric information according to the first biometric control parameter.

The third acquiring unit 405 is configured to acquire second biometric information, when the first biometric recognition is passed.

The recognition unit 404 is further configured to perform a second biometric recognition on the second biometric information, according to the second biometric control parameter.

The processing unit 406 is configured to perform a next unlocking process, when the second biometric recognition is passed.

Optionally, the first acquiring unit 401 executes the operation of acquiring an environmental parameter, and the second acquiring unit 402 executes the operation of acquiring first biometric information simultaneously.

Figure 4B:
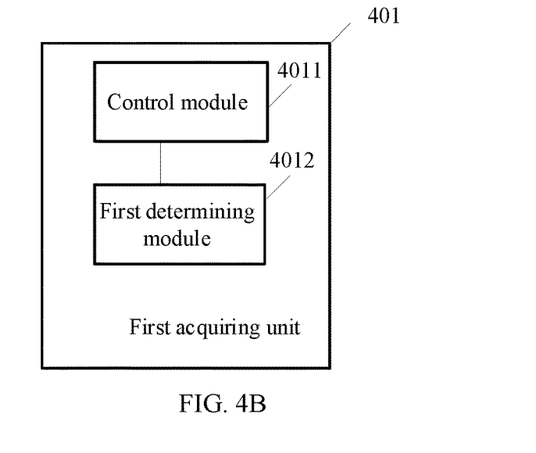
FIG. 4B is a schematic structural diagram of a first acquiring unit of the unlocking control device illustrated in FIG. 4A, according to an embodiment of the disclosure.

Optionally, as illustrated in FIG. 4B, FIG. 4B is a specific detailed structure of the first acquiring unit 401 of the unlocking control device of FIG. 4A. The first acquiring unit 401 may include a control module 4011 and a first determining module 4012, details are as follows.

The control module 4011 is configured to acquire the environmental information of a specified period of time, wherein the specified period of time begins with a start time of the operation of acquiring the first biometric information, and ends with a completion time of the operation of acquiring the first biometric information.

The first determining module 4012 is configured to determine the environmental parameter according to the environmental information.

Optionally, when determining a first biometric control parameter and second biometric control information corresponding to the environmental parameter, the determining unit 403 is configured to:
determining a first biometric control information corresponding to the environmental parameter, according to a preset correspondence between preset environmental parameters and preset first biometric control parameters; and
determining a second biometric control parameter corresponding to the environmental parameter, according to a preset correspondence between preset environmental parameters and preset second biometric control parameters.

Figure 4C:
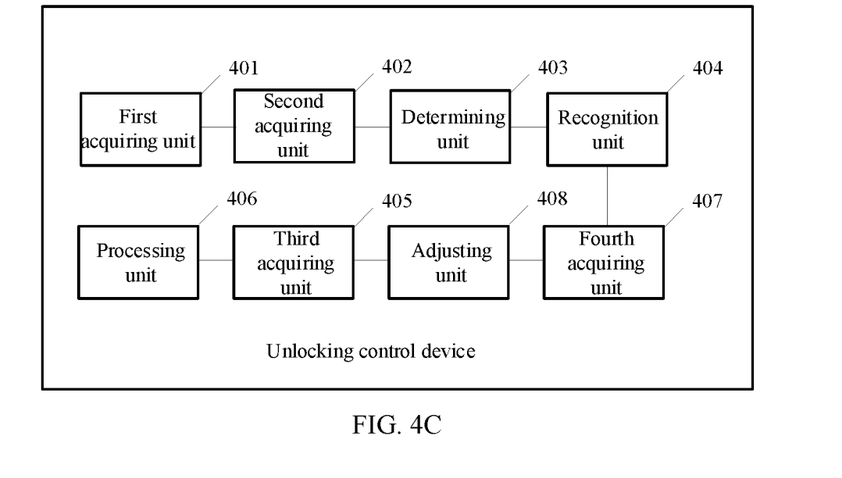
FIG. 4C is a schematic structural diagram of another unlocking control device according to an embodiment of the disclosure.

Optionally, as illustrated in FIG. 4C, FIG. 4C is a modified structure of the unlocking control device shown in FIG. 4A, the unlocking control device of FIG. 4C further includes a fourth acquiring unit 407 and an adjusting unit 408 as follows.

The fourth acquiring unit 407 is configured to acquire a matching value corresponding to the first biometric information.

The adjusting unit 408 is configured to adjust the second biometric control information according to the matching value. The recognition unit 404 performs the operation of performing the second biometric recognition on the second biometric information according to the second biometric control parameter as: performing the second biometric recognition on the second biometric information according to the adjusted second biometric control parameter.

Figure 4D:
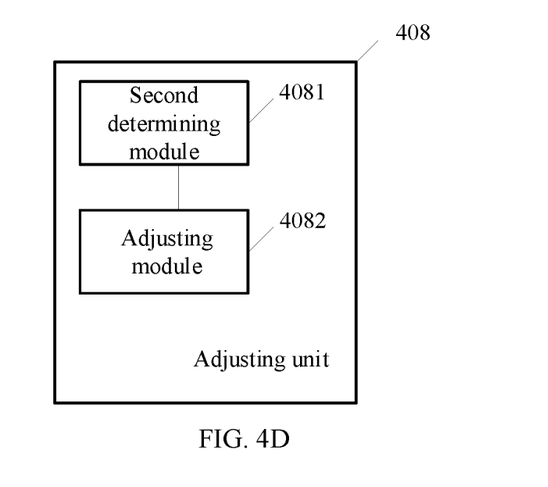
FIG. 4D is a schematic structural diagram of an adjusting unit of the unlocking control device illustrated in FIG. 4C, according to an embodiment of the disclosure.

Optionally, the first biometric information corresponds to a first recognition threshold, and the first recognition threshold is smaller than the matching value. As illustrated in FIG. 4D, FIG. 4D is a specific detailed structure of the adjusting unit 408 of the unlocking control device of FIG. 4C. The adjusting unit 408 may include a second determining module 4081 and an adjusting module 4082, details are as follows.

The second determining module 4081 is configured to determine a difference between the matching value and the first recognition threshold.

The second determining module 4081 is further configured to determine, according to a preset correspondence between numerical ranges and adjustment factors, a target adjustment factor corresponding to the difference.

The adjusting module 4082 is configured to adjust the second biometric control information according to the target adjustment factor.

It can be seen that, the unlocking control device of embodiment of the disclosure, can execute operations including: acquiring an environmental parameter; acquiring first biometric information; determining a first biometric control parameter and second biometric control information corresponding to the environmental parameter; performing a first biometric recognition on the first biometric information according to the first biometric control parameter; when the first biometric recognition is passed, adjusting the second biometric control information according to the matching value; acquiring second biometric information; performing a second biometric recognition on the second biometric information, according to the adjusted second biometric control information; when the second biometric information is recognized, performing a next unlocking process. Therefore, control parameters suitable for the environment can be set, recognition processes are controlled based on these dynamically adjusted control parameters, thereby improving the pass rate and the efficiency of the multi-biometric recognition.

It can be understood that, the functions of the program modules in the unlocking control device may be specifically implemented according to the method in the foregoing method embodiments. Specific implementation processes may be referred to the descriptions of the foregoing method embodiments, and details are not described herein again.

Figure 5:
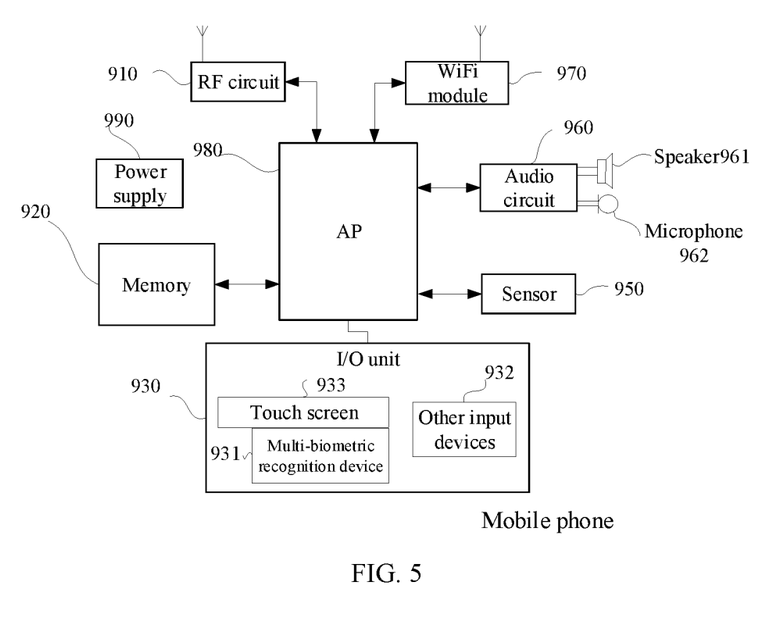
FIG. 5 is a schematic structural diagram of still another electronic device according to an embodiment of the disclosure.

FIG. 5 illustrates another electronic device, according to an embodiment of the disclosure. For the convenience of description, just portions related to the embodiments of the disclosure are illustrated. The specific technical details not disclosed can be referred to the method embodiments of the disclosure. The electronic device may be any terminal device selected form a mobile phone, a tablet computer, a personal digital assistant (PDA), a point of sales (POS), an in-vehicle computer, and the like. The mobile phone is taken as an example.

FIG. 5 is a block diagram showing a part of structures of a mobile phone related to an electronic device provided by an embodiment of the disclosure. Referring to FIG. 5, the mobile phone includes a radio frequency (RF) circuit 910, a memory 920, an input unit 930, a sensor 950, an audio circuit 960, a wireless fidelity (WiFi) module 970, an application processor (AP) 980, a power supply 990 and the like. It will be understood by those skilled in the art that the structures of the mobile phone as shown in FIG. 5 does not constitute a limitation to the mobile phone, and the mobile phone may include more or less components than those illustrated, or a combination of some components, or different arrangements of the components.

The following describes the components of the mobile phone in detail with reference to FIG. 5.

The input unit 930 can be used to receive input numeric or character information, as well as to generate signal inputs related to user settings and function controls. Specifically, the input unit 930 can include a touch display 933, a multi-biometric recognition device 931 and other input devices 932. The multi-biometric recognition device 931 at least includes two biometric recognition devices (e.g., face recognition device and iris recognition device). The input unit 930 also includes other input devices 932. Specifically, other input devices 932 may include, but are not limited to, one or more of a physical keyboard, function keys (such as volume control buttons, switch buttons, etc.), a trackball, a mouse, a joystick, and the like.

The AP 980 is configured to execute the operations of:
acquiring an environmental parameter;
acquiring first biometric information;
determining a first biometric control parameter and second biometric control information corresponding to the environmental parameter;
performing a first biometric recognition on the first biometric information according to the first biometric control parameter;
acquiring second biometric information, when the first biometric recognition is passed; performing a second biometric recognition on the second biometric information, according to the second biometric control parameter;
performing a next unlocking process, when the second biometric recognition is passed.

The AP 980 is the control center of the mobile phone, which connects various portions of the entire phone using various interfaces and lines, by performing or executing software programs and/or modules stored in the memory 920, and by invoking data stored in the memory 920, thereby implementing the various functions of the mobile phone and processing data to monitor the mobile phone. Optionally, the AP 980 may include one or more processing cores. Optionally, the AP 980 may integrate an application processor and a modem processor, where the application processor mainly processes the operating system, the user interfaces, the applications, and the like, and the modem processor primarily handles wireless communications. It will be understood that the above described modem processor may also not be integrated into the AP 980.

Moreover, the memory 920 can include a high speed random access memory, and can also include a non-volatile memory, such as at least one magnetic disk storage device, a flash memory device, or other volatile solid state storage device.

The RF circuit 910 can be used for transmitting and receiving messages. Generally, the RF circuit 910 includes, but is not limited to, an antenna, at least one amplifier, a tuner, one or more oscillators, a Subscriber Identity Module (SIM) card, a transceiver, a coupler, a low noise amplifier (LNA), and a duplexer, etc. In addition, the RF circuit 910 can also communicate with the network and other devices through wireless communication. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The mobile phone also can include at least one type of the sensor 950, such as a light sensor, a motion sensor, and other sensors. Specifically, the light sensor may include an ambient light sensor and a proximity sensor, wherein the ambient light sensor may adjust the brightness of the touch display according to the brightness of the ambient light, and the proximity sensor may close the touch display and/or the backlight when the mobile phone moves to the ear of the user. As a kind of motion sensor, a gravity acceleration sensor can detect the magnitude of acceleration in all directions (usually three axes). When it is stationary, it can detect the magnitude and direction of gravity. It can be used to identify the gesture of the mobile phone (such as horizontal and vertical screen switching, related games, magnetometer attitude calibrations), vibration recognition related functions (such as a pedometer, the tapping), etc. Other sensors such as gyroscopes, barometers, hygrometers, thermometers, infrared sensors, etc., also can be disposed in the mobile phone and are not detailed here.

The audio circuit 960, a speaker 961, and a microphone 962 can provide an audio interface between the user and the terminal 900. The audio circuit 960 can convert the received audio data into electrical signals and transmit the electrical signals to the speaker 961, the speaker 961 converts the electrical signals into sound signals and output the sound signals. On the other hand, the microphone 962 converts the collected sound signals into electrical signals, the electrical signals are received by the audio circuit 960 and then converted into audio data, the audio data is then processed by the AP 980, and then is sent to another terminal via the RF circuitry 910, or the audio data is output to the memory 920 for further processing.

WiFi is a short-range wireless transmission technology, and the mobile phone can help users to send and receive emails, browse web pages, and access streaming media through the WiFi module 970, which provides wireless broadband internet access for users. Although FIG. 5 shows the WiFi module 970, it can be understood that it is not the necessary configuration of the terminal, and may be omitted as needed within the scope of not changing the essence of the disclosure.

The mobile phone also includes the power supply 990 (such as a battery) that supplies power to the various components. Optionally, the power supply 990 can be logically coupled to the AP 980 through a power management system to manage functions such as charging, discharging, and power management.

Although not shown, the mobile phone may further include a camera, a Bluetooth module, and the like, and details are not described herein again.

In the foregoing embodiments shown in FIG. 1C and FIG. 2, each step, method, or operation can be implemented based on the structure of the mobile phone.

In the foregoing embodiments shown in FIG. 3 and FIG. 4A to FIG. 4D, the function of each unit can be implemented based on the structure of the mobile phone.

The embodiment of the disclosure further provides a computer storage medium, wherein the computer storage medium stores a computer program, which enables the computer to execute a part of steps or all steps of any of the unlocking control method as described in the foregoing method embodiments.

The embodiment of the disclosure further provides a computer program product, which includes a non-transitory computer readable storage medium storing a computer program, the computer program being executable to enable a computer to perform a part of steps or all steps of the unlocking control method recited in the foregoing method embodiments.

It should be noted that, for simple description, the foregoing method embodiments are all described as a series of operation combinations, but those skilled in the art should understand that the disclosure is not limited by the described action sequence. Because certain steps may be performed in other sequences or concurrently, according to the embodiments of the disclosure. Those skilled in the art should also understand that the embodiments described in the specification are all preferred embodiments, and the operations and modules involved are not necessarily by the disclosure.

In the above embodiments, the description of every embodiment is different, and the details that are not described in a certain embodiment can be referred to the related descriptions of other embodiments.

In several embodiments of the disclosure, it should be understood that the disclosed device may be implemented in other manners. The device embodiments described above are merely illustrative. For example, the division of the unit is only a logical function division. In actual implementation, there may be another division manner, such as multiple units or components may be combined or may be integrated into another system, or some features can be omitted or not executed. In addition, the mutual coupling or direct coupling or communication connection shown or discussed may be an indirect coupling or communicating connection through some interfaces, devices or units, and may be electrical or other ways.

The units described as separate components maybe or maybe not physically separated, and the components shown as units maybe or maybe not physical units, that is, the component may be located in one place, or may be distributed to several network units. Some or all of the units may be selected according to actual needs to achieve the purpose of the solution of the embodiment.

Each functional unit in the embodiment of the disclosure may be integrated into one processing module, or each unit may exist physically separately, or two or more units may be integrated into one module. The above integrated modules can be implemented in the form of hardware or in the form of software functional modules.

The integrated modules, if implemented in the form of software functional modules and sold or used as stand-alone products, may also be stored in a computer readable storage medium. Based on such understanding, the technical solution of the disclosure, in essence or the contribution to the prior art, or all or part of the technical solution may be embodied in the form of a software product. The software product is stored in a memory, and includes a number of instructions configured to enable a computer device (may be a personal computer, a server or a network device, etc.) to perform all or part of the steps of the methods described in the embodiments of the disclosure. The foregoing memory includes a U disk, a read-only memory (ROM), a random access memory (RAM), a mobile hard disk, a magnetic disk, or an optical disk, and the like, that can store program codes.

A person skilled in the art can understand that all or part of the steps of the foregoing embodiments can be performed by a program to instruct related hardware, and the program can be stored in a computer readable memory, and the memory can include a flash drive, a ROM, a RAM, a disk or a CD.

The embodiments of the disclosure have been described in detail above. The principle and implementation of the disclosure are described in the specific examples. The description of the above embodiments is only used to help to understand the method and the spirit of the disclosure. Those skilled in the art may modify the specific embodiments and the scope of the application according to the spirit of the disclosure. In summary, the content of the specification should not be construed as limitations of the disclosure.

What is claimed is:

1. An electronic device, comprising an environmental sensor, a first biometric recognition device, a second biometric recognition device, and an application processor, the environmental sensor, the first biometric recognition device and the second biometric recognition device each being connected to the application processor, wherein:

the environmental sensor is configured to acquire an environmental parameter;

the first biometric recognition device is configured to acquire first biometric information;

the application processor is configured to determine a first biometric control parameter and a second biometric control parameter corresponding to the environmental parameter, perform a first biometric recognition on the first biometric information according to the first biometric control parameter, acquire a matching value corresponding to the first biometric information, and adjust the second biometric control parameter according to the matching value;

the second biometric recognition device is configured to acquire second biometric information, when the first biometric recognition is passed; and the application processor is configured to perform a second biometric recognition on the second biometric information, according to the adjusted second biometric control parameter, and perform a next unlocking process when the second biometric recognition is passed.

2. The electronic device according to claim 1, wherein the operation of acquiring an environmental parameter is in parallel with the operation of acquiring first biometric information.

3. The electronic device according to claim 1, wherein the environmental sensor is configured to:
acquire the environmental information of a specified period of time, wherein the specified period of time begins with a start time of the operation of acquiring the first biometric information, and ends with a completion time of the operation of acquiring the first biometric information; and
determine the environmental parameter according to the environmental information.

4. The electronic device according to claim 1, wherein the application processor is further configured to:
determine a first biometric control parameter corresponding to the environmental parameter, according to a preset correspondence between preset environmental parameters and preset first biometric control parameters; and determine a second biometric control parameter corresponding to the environmental parameter, according to a preset correspondence between preset environmental parameters and preset second biometric control parameters.

5. The electronic device according to claim 1, wherein the first biometric recognition is determined to be passed in response to the matching value being greater than a first recognition threshold corresponding to the first biometric control parameter;
wherein the application processor is configured to:
determine a difference between the matching value and the first recognition threshold;
determine a target adjustment factor corresponding to the difference, according to a preset correspondence between adjustment factors and numerical ranges to which the difference belongs; and
adjust the second biometric control parameter according to the target adjustment factor.

6. The electronic device according to claim 1, wherein the matching value is a first matching value of the first biometric information and a first preset biometric template information corresponding to the first biometric control parameter, and the first biometric recognition is determined to be passed when the first matching value is greater than a first recognition threshold; and
the second biometric recognition is determined to be passed when a second matching value of the second biometric information and a second preset biometric template information corresponding to the adjusted second biometric control parameter is greater than a second recognition threshold, and a sum of the first matching value and the second matching value is preset.

7. The electronic device according to claim 1, wherein the application processor is further configured to:
determine whether a current environment is a weak light environment according to the environmental parameter;
perform image enhancement processing on the first biometric information in response to the current environment being the weak light environment; and
when performing a first biometric recognition on the first biometric information according to the first biometric control parameter, the application processor is configured to:
perform the first biometric recognition on the enhanced first biometric information according to the first biometric control parameter.

8. The electronic device according to claim 1, wherein the application processor is further configured to:
perform image quality evaluation on the first biometric information to obtain an image quality evaluation value, wherein the first biometric information is evaluated by more than one image quality evaluation index, and the more than one image quality evaluation index each corresponds to a weight; and
perform, in response to the image quality evaluation value being lower than a preset quality threshold, image enhancement processing on the first biometric information to acquire enhanced first biometric information; and
when performing a first biometric recognition on the first biometric information according to the first biometric control parameter, the application processor is configured to:
perform the first biometric recognition on the enhanced first biometric information according to the first biometric control parameter.

9. An unlocking control method, comprising:
acquiring an environmental parameter;
acquiring first biometric information;
determining a first biometric control parameter and a second biometric control parameter corresponding to the environmental parameter;
performing a first biometric recognition on the first biometric information according to the first biometric control parameter, and acquiring a matching value corresponding to the first biometric information;
adjusting the second biometric control parameter according to the matching value;
acquiring second biometric information when the first biometric recognition is passed;
performing a second biometric recognition on the second biometric information, according to the adjusted second biometric control parameter; and
performing a next unlocking process when the second biometric recognition is passed.

10. The method according to claim 9, wherein the operation of acquiring an environmental parameter is in parallel with the operation of acquiring first biometric information.

11. The method according to claim 9, wherein acquiring an environmental parameter comprises:
acquiring the environmental information of a specified period of time, wherein the specified period of time begins with a start time of the operation of acquiring the first biometric information, and ends with a completion time of the operation of acquiring the first biometric information; and
determining the environmental parameter according to the environmental information.

12. The method according to claim 9, wherein determining a first biometric control parameter and a second biometric control parameter corresponding to the environmental parameter comprises:
determining a first biometric control parameter corresponding to the environmental parameter, according to a preset correspondence between preset environmental parameters and preset first biometric control parameters; and determining a second biometric control parameter corresponding to the environmental parameter, according to a preset correspondence between preset environmental parameters and preset second biometric control parameters.

13. The method according to claim 9, wherein the first biometric recognition is determined to be passed when the matching value is greater than a first recognition threshold corresponding to the first biometric control parameter; and
the operation of adjusting the second biometric control parameter according to the matching value comprises:
determining a difference between the matching value and the first recognition threshold;
determining, according to a preset correspondence between numerical ranges and adjustment factors, a target adjustment factor corresponding to the difference; and
adjusting the second biometric control parameter according to the target adjustment factor.

14. The method according to claim 13, wherein the adjustment factors comprise an algorithm identifier of a second identification algorithm, a threshold reduction coefficient for reducing a second recognition threshold, and a reduced recognition area coefficient.

15. The method according to claim 9, wherein the first biometric information is an image, after acquiring the first biometric information, the method further comprises:
performing an image enhancement processing on the first biometric information in response to determining that a current environment is a weak light environment according to the environmental parameter;
wherein the performing a first biometric recognition on the first biometric information according to the first biometric control parameter and acquiring a matching value corresponding to the first biometric information, comprises:
performing, according to the first biometric control parameter, the first biometric recognition on the enhanced first biometric information to acquire the matching value.

16. The method according to claim 9, wherein the first biometric information is an image, after acquiring the first biometric information, the method further comprises:
performing image quality evaluation on the first biometric information, and obtaining an image quality evaluation value, wherein the first biometric information is evaluated by more than one image quality evaluation index, and the more than one image quality evaluation indexes each correspond to a weight; and
performing image enhancement processing on the first biometric information when the image quality evaluation value is lower than a preset quality threshold;
wherein the operation of performing, according to the first biometric control parameter, a first biometric recognition on the first biometric information to acquire a matching value corresponding to the first biometric information, comprises:
performing, according to the first biometric control parameter, the first biometric recognition on the enhanced first biometric information to acquire the matching value.

17. The method according to claim 16, wherein the image quality evaluation indexes are selected from the group consisting of average value, standard deviation, entropy, sharpness, and signal to noise ratio.

18. The method according to claim 9, wherein a first preset biometric template information is pre-stored, the operation of performing a first biometric recognition on the first biometric information according to the first biometric control parameter and acquiring a matching value corresponding to the first biometric information, comprises:
selecting a first recognition threshold and a first recognition algorithm corresponding to the environmental parameter;
matching the first biometric information and the preset biometric template information based on the first recognition algorithm to acquire the matching value; and
determining whether the first biometric recognition is passed or not according to the matching value, wherein it is determined to be passed when the matching value is greater than the first recognition threshold.

19. The method according to claim 9, wherein the performing a first biometric recognition on the first biometric information according to the first biometric control parameter, and acquiring a matching value corresponding to the first biometric information, comprises:
matching the first biometric information with a first preset biometric template information corresponding to the first biometric control parameter to thereby acquire the matching value, wherein the first biometric recognition is determined to be passed when the matching value is greater than a first recognition threshold corresponding to the first biometric control parameter;
wherein the performing a second biometric recognition on the second biometric information according to the adjusted second biometric control parameter, comprises:
matching the second biometric information with a second preset biometric template information corresponding to the adjusted second biometric control parameter to thereby acquire another matching value, wherein the second biometric recognition is determined to be passed when the another matching value is greater than a second recognition threshold corresponding to the second biometric control parameter, and a sum of the first matching value and the second matching value is preset.

20. An electronic device, comprising an application processor, a memory and one or more programs, wherein the one or more programs are stored in the memory and configured to be executed by the application processor, the one or more programs comprises instructions to perform an unlocking control method, the method comprises:
acquiring an environmental parameter;
acquiring first biometric information, wherein the first biometric information is an image;
performing image quality evaluation on the first biometric information, and obtaining an image quality evaluation value, wherein the first biometric information is evaluated by more than one image quality evaluation index, and the more than one image quality evaluation indexes each correspond to a weight;
performing, in response to the image quality evaluation value being lower than a preset quality threshold, image enhancement processing on the first biometric information to thereby acquire enhanced first biometric information;
determining a first biometric control parameter and a second biometric control parameter corresponding to the environmental parameter;
performing a first biometric recognition on the enhanced first biometric information according to the first biometric control parameter;

acquiring second biometric information when the first biometric information is recognized;

performing a second biometric recognition on the second biometric information, according to the second biometric control parameter; and performing an unlocking process when the second biometric information is recognized.

\* \* \* \* \*